Dec. 25, 1923. 1,478,623
F. H. VALITON
DRILL
Filed Jan. 20, 1922
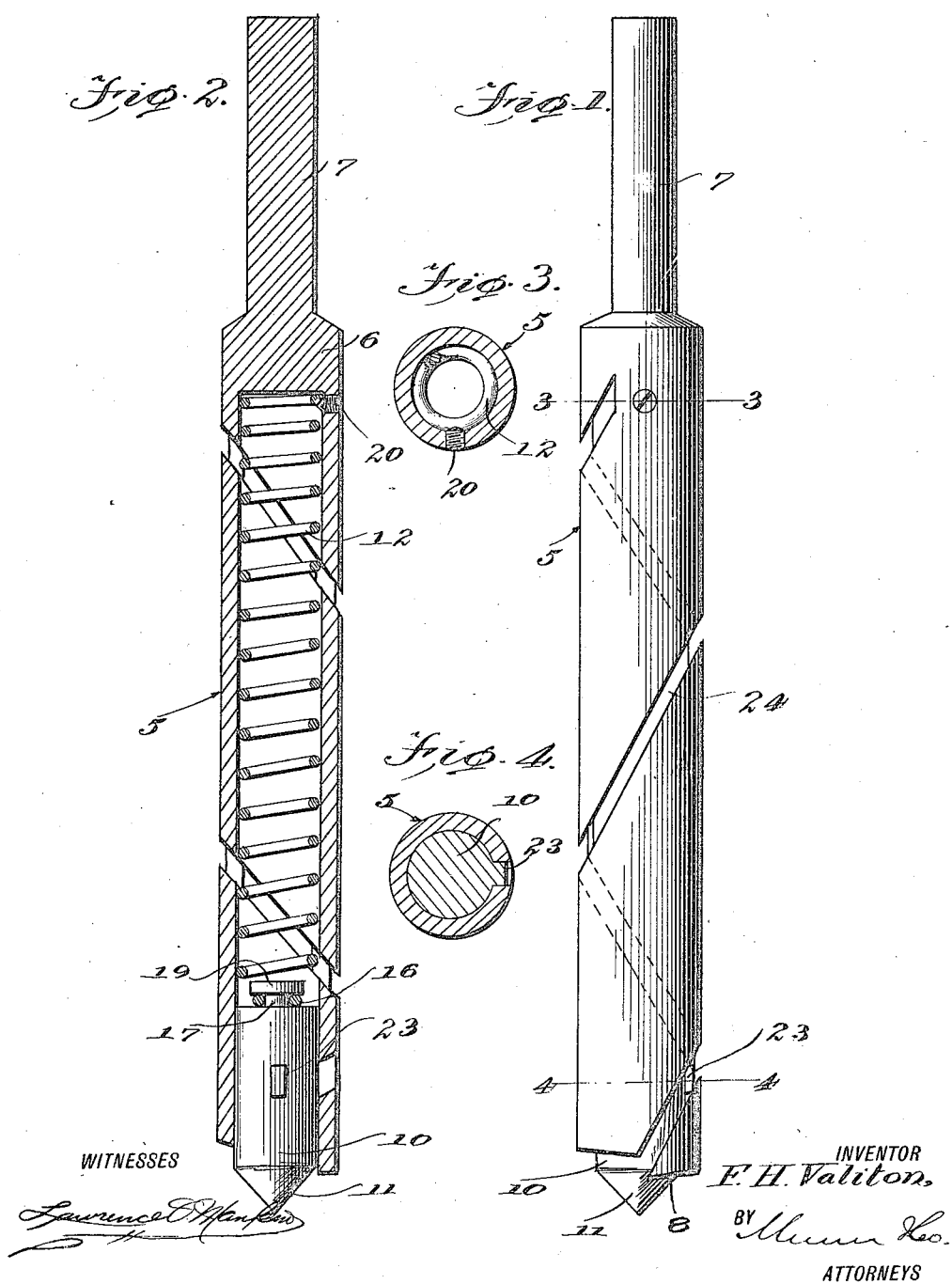
INVENTOR
F. H. Valiton Patented Dec. 25, 1923.

1,478,623

UNITED STATES PATENT OFFICE.

FREDERICK HENRY VALITON, OF DEER LODGE, MONTANA, ASSIGNOR OF ONE-HALF TO PHILIP L. O'NEILL, OF DEER LODGE, MONTANA.

DRILL.

Application filed January 20, 1922. Serial No. 530,618.

*To all whom it may concern:*

Be it known that I, FREDERICK HENRY VALITON, a citizen of the United States, and a resident of Deer Lodge, in the county of Powell and State of Montana, have invented certain new and useful Improvements in Drills, of which the following is a specification.

This invention relates to drills especially adapted for cutting metal.

An important object of this invention is to provide a drill having means for making an annular cut in the work so that a cylindrical piece of metal is removed from the body of the metal thereby leaving a cylindrical hole of the desired size.

Further the invention forming the subject matter of this application aims to provide novel means whereby the improved drill may be properly centered regardless of the pressure applied to the same.

Also the invention aims to provide a metal cutting drill having novel means whereby the shavings may be discharged so as not to interfere with the drilling operation.

A further object is to provide a drill of the class specified which is of highly simplified construction, durable in use and cheap to manufacture.

Other objects and advantages of the invention will be apparent during the course of the following description.

In the accompanying drawings forming a part of this application, and in which like numerals refer to like parts, Figure 1 is a side elevation of the improved drill.

Figure 2 is a vertical sectional view through the drill.

Figure 3 is a horizontal sectional view taken on line 3—3 of Figure 1.

Figure 4 is a horizontal sectional view taken on line 4—4 of Figure 1.

In the drawings wherein for the purpose of illustration is shown a preferred embodiment of the invention the numeral 5 designates a tubular body having its rear end closed as indicated at 6 and formed with a shank 7, by means of which the improved drill may be connected to a chuck. Of course the shank 7 may be of any desired type.

The invention forming the subject matter of this application resides in the particular construction of the tubular body 5 and in the means for centering the same on a piece of work. With reference to Figures 1 and 2 it will be observed that the forward end of the tubular body is somewhat beveled to provide a cutting lip 8 which is extended beyond the opposite side of the body so as to cut into the metal when pressure is applied to the drill.

A centering pin 10 of cylindrical formation is arranged within the tubular body 5 and has its forward portion tapered to a point as indicated at 11, said point being adapted to engage an indentation in the metal so as to properly center the drill. It is to be understood, of course, that the said indentation is formed by a centering punch or the like and when the tapered end 11 of the centering pin is inserted into the indentation the drill will be properly centered.

The centering pin is urged to its advanced position by means of a coiled spring 12 arranged within the tubular body and having its rear end engaged with the closed end 6 of the body. With reference to Figure 2 it will be observed that the foremost convolution 16 of the coiled spring 12 is engaged with the neck 17 of the centering pin and with a disc shaped head 19 formed at the rear end of the shank. However, the neck 17 is rotatably connected to the foremost convolution 16 so that when the drill is operated the centering pin may move with relation to spring. A set screw 20 is threaded through the rear portion of the tubular body and is engaged with the rearmost convolution of the coil spring whereby to anchor the coil spring in its position and thereby hold the centering pin against movement out of the body.

The centering pin is provided intermediate its ends with a radially arranged lug 23 extended into a spiral slot 24 in the tubular body. As the radial lug 23 operates in the spiral slot 24 the injury of the coil spring is prevented.

In operation the drill is rotated and advanced in the usual manner so that the substantially triangular lip 8 will be presented to the piece of work and the continued advancement of the bit will produce an annular cut thereby causing a cylindrical piece to be removed from the work. As the drill is advanced, the centering pin properly positions the drill and the drill partakes of a slight movement longitudinally with relation to the centering pin. In the case of a deep cut the centering pin and the coil spring 12 may be removed after the cut has been started. With reference to Figure 1 it will be seen that the spiral slot extends out through the forward end of the drill and that one side of the spiral slot forms one wall of the lip 8.

With reference to the foregoing description taken in connection with the accompanying drawings, it will be seen that a drill constructed in accordance with this invention operates in an efficient and economical manner since all of the material to be removed is not engaged by the drill but only that material at the outer side of the cut is removed.

Attention is directed to the fact that the lug 23 not only serves as a means for causing the centering pin to rotate with the body, but also as a means for directing the cuttings laterally from the body. It will be seen that the cuttings will travel in the spiral slot 24 until they contact with the lug 23 which will act as a means for directing the material away from the body, whereby the material is prevented from entering the socket of the body and rendering the spring inoperative.

Also a slot extends in the direction opposite the direction of rotation of the drill so that the cuttings are freely received within the slot.

The foremost convolution of the spring is encircled about the neck 17 of the centering pin and permits the pin to rotate within the body as the pin is forced into the body. By thus rotatably connecting the pin to the spring the breaking of the spring due to twisting the same is prevented.

The cutting lip is of the same width as the depth of the slot so that the cuttings are permitted to pass through the slot without binding against the wall of the opening being drilled.

Having thus described the invention, what is claimed is:

1. A drill comprising a body having a socket of the same diameter throughout and opening out through the forward end of the body, the wall of the socket being provided with a single spiral material discharging slot extending for the major portion of the length of the wall and in the direction opposite the direction of rotation of the drill, said spiral slot being extended out through the forward end of the body thereby defining a single cutting lip, a spring arranged in said socket, means detachably securing the spring within the socket and against rotation, a centering pin snugly and slidably fitted in said socket and having a head permanently and rotatably connected to said spring, said pin being provided with a lug arranged in said slot to direct the cuttings away from the socket and spring, and to cause the centering pin to rotate with the body, the depth of the slot being equal to the width of the cutting lip, whereby to permit of the free passage of the cuttings.

2. A drill comprising a body having a socket, the wall of which is provided with a single spiral material discharging slot opening out through the forward end of the body, and providing a cutting lip, a spring arranged in said socket, means detachably securing the spring within the socket against rotation, and a centering pin snugly and slidably fitted in said socket and having a head permanently and rotatably connected to said spring, said pin being provided with a lug arranged in said slot to direct the cuttings away from the socket and spring, and to cause the centering pin to rotate with the body.

3. An annular drill comprising a body having a socket a spiral slot extending entirely through the wall of the socket, and a centering pin in said socket and having a lug, said lug having the width of and movable in said slot for causing the pin to rotate with the body and for directing the material away from the socket.

4. A drill comprising a body having a socket and a material receiving slot, a centering pin movable in said socket and having means extending through the slot for directing the cuttings away from the body and the socket therein upon leaving the hole being drilled, and a spring urging the pin to its advanced position.

5. An annular drill comprising a body having a socket and a spiral slot extending for the major portion of the socket and opening out through the forward end of the drill thereby defining a cutting lip, a centering pin in said socket and having a lug movable in said slot for causing the pin to rotate with the body and for directing the material away from the socket, and a spring urging said centering pin to its advanced position.

6. A drill comprising a relatively long tubular body, the wall of which is formed with a material receiving slot of spiral formation extending for the major portion thereof and opening out through the forward end of the tubular body to define a cutter, said slot being of a depth equal to the width of the cutter to freely receive the cuttings whereby the cuttings during egress are spaced from destructive contact with the wall of the hole being drilled, and means directing the cuttings away from the tubular body upon leaving the hole being drilled.

7. A drill comprising a body having a socket and a cutter at the forward end of the socket, the wall of the socket being provided with a slot extending for the major portion thereof and opening out through the forward end of the body to receive the cuttings and means movable in said slot for directing the cuttings away from the socket when the cuttings leave the hole.

8. A drill comprising a body having a socket and a cutter at the forward end of the socket, the wall of the socket being provided with a slot extending for the major portion thereof and opening out through the forward end of the body to receive the cuttings, the said slot being of a depth equal to the width of the cutter to freely receive the cuttings, means movable in said slot for directing the cuttings away from the socket when the cuttings leave the hole and a centering pin within said socket and having connection with said means whereby a driving connection is established between said body and said pin.

FREDERICK HENRY VALITON.